United States Patent [19]

Maguer et al.

[11] 3,967,233

[45] June 29, 1976

[54] SONAR SYSTEM FOR CLASSIFYING SUBMERGED OBJECTS

[75] Inventors: Pierre Maguer, Le-Relecq-Kerhuon; Paul Gourlay, Vanves, both of France

[73] Assignee: Etat Francais, France

[22] Filed: Aug. 8, 1974

[21] Appl. No.: 495,905

[30] Foreign Application Priority Data
Aug. 16, 1973 France .............................. 73.29806

[52] U.S. Cl. ............................... 340/3 R; 340/5 MP
[51] Int. Cl.[2] ......................... G01S 9/66; G01S 7/62
[58] Field of Search .......... 340/1 R, 3 R, 6 R, 5 MP

[56] References Cited
UNITED STATES PATENTS

| | | | |
|---|---|---|---|
| 3,144,631 | 8/1964 | Lustig et al. ......................... | 340/3 R |
| 3,585,579 | 6/1971 | Dorr et al. .............................. | 340/9 |
| 3,742,436 | 6/1973 | Jones .................................. | 340/3 R |

*Primary Examiner*—Richard A. Farley
*Attorney, Agent, or Firm*—Larson, Taylor and Hinds

[57] ABSTRACT

A sonar system capable of identifying submerged objects near the ocean floor is provided. Transmitting and receiving transducers are mounted on a common support including an arrangement for pivoting the transducers around a vertical axis. The signals from the receiving transducer are amplified and appropriate phase shifting is provided to form very narrow, close monitoring channels focused in the Fresnel region of the transducer. Sampling circuitry for sequentially sampling the monitoring channels provides a signal for a CRT display and a memory lens. Possible applications include the detection and identification of influence ground mines.

7 Claims, 2 Drawing Figures

SONAR SYSTEM FOR CLASSIFYING SUBMERGED OBJECTS

FIELD OF THE INVENTION

The present invention relates to sonar systems, and, more particularly, to an improved sonar capable of detecting and identifying objects resting near or at the bottom of the ocean.

BACKGROUND OF THE INVENTION

Sonar systems that make it possible to recognize the shape of the ocean bottom or to detect the presence of an object on the bottom or floating near the bottom are known in the art. These sonars transmit pulses and receive echoes by means of arrays, comprised of banks of electroacoustic transducers. The receiving transducer is coupled to a device to form monitoring channels, each corresponding to a given position. An object located close to the ocean bottom will send back an echo and also a "shadow" by projection on the ocean bottom. The electrical signals corresponding to the echoes picked up on each channel are displayed on the screen of the cathode ray tube and the shadow projected by the object appears by contrast.

Prior sonar systems make it possible to recognize the presence of objects but do not enable one to identify such objects with precision, due to the poor quality of the image obtained. This poor image quality is caused by the weak distance and angular resolution power provided by previous systems.

Distance resolution is dependent on the width of the acoustic pulses produced by the transmitting transducer. To improve the quality of the images, the pulse width should be reduced. However, a reduced pulse width means that less acoustic energy is transmitted and echoes of less energy are received. Thus, a gain in resolution is offset by a loss in sonar range. This reduction of received energy is aggravated by the fact that it is necessary to use very short ultrasonic waves to reduce transducer dimensions. The angular width of the acoustic beams picked up, which determines the resolution in bearings, depends directly upon the ratio of the dimensions of the transducer, or antenna base, to the length of the acoustic wave used, the angular width being narrower as the aforementioned ratio increases.

Another important difficulty arises from the fact that the range of sonars is generally such that the scan of the receiving transducer takes place in a close field within the Fresnel region of the transducer, i.e., the region in which the acoustic waves are not planar. This causes the acoustic beam picked up by the receiving transducer to have a relatively large angular width, and high level side lobes which considerably limits the bearing resolution power and the contrast and makes recognition of small objects uncertain.

SUMMARY OF THE INVENTION

The present invention provides a highly advantageous resolution of the difficulties discussed above which enables the provision of a sonar with sufficiently precise resolving power to furnish an image on a screen of the silhouette of an object, submerged in the vicinity of the ocean bottom, with clarity, definition and contrast sufficient to permit identification of the object.

In a preferred embodiment, a sonar system is provided which includes an projector for transmitting very short, periodic acoustic pulses or bursts made up of very short ultrasonic waves, and, a receiving transducer mounted on the same support. An arrangement for forming very narrow channels for monitoring the incoming echoes is connected to the aforementioned receiving transducer and a sequential sampling circuit is used to display this information on a cathode ray tube (CRT) display. Synchronization of transmitted pulses, reception of echoes from the object area, sampling of the monitor channels and sweeping the scan of the display CRT are controlled from a single time base.

According to the invention, the receiving transducer provides focusing of the acoustic beams at a point located within the Fresnel region of the transducer to decrease the width of the monitoring channels. In accordance with a preferred embodiment, the receiving transducer is comprised of vertical columns of hydrophones arranged symmetrically in a plane in relation to an acoustic axis. The electrical signals from different columns are passed through phase shift circuits, which introduce phase shift between signals from different columns. These phase shifts are weighted as a function of the distance from the columns to the acoustic axis so that the acoustic beams are focused inside the Fresnel region.

Similar phase shift networks can be used to form the monitoring channels. The focusing distance chosen is approximately equal to one fourth the length of the Fresnel region so that the acoustic beams remain narrow on the entire depth of the working field. For example, at the focal point, the monitoring channels have a width on the order of 30 cm. and a pitch on the order of 20 cm.

Resistors are connected in series with the output of each monitor, with values so as to weight each output as a function of distance from the acoustic axis, according to the law of the theory of Chebyshev polynomials. The difference between the main lobe and the secondary lobes is preferably at least 21dB.

The signal output from each channel is sampled and displayed on a first CRT display. To improve the possibilities of identification, a "lens" formed by a second CRT is provided, making it possible to display, on a larger scale, a limited zone of the first which can be moved over the entire extent of the field of the first CRT.

In combination with this lens, an analog to digital converter encodes, in binary form, the sequential signals from the channel sampling device. A memory, preferably comprising magnetostrictive delay lines is looped so as to permit the same signal to be displayed repeatedly. A digital to analog converter connected to the memory decodes the binary coded signal into a form that can be displayed by the second CRT. Thus, the second CRT can either enlarge an area of the first CRT and "hold" an image for careful study.

Other features and advantages of the invention will be set forth in, or will be apparent from, a detailed description of the preferred embodiments found hereinbelow.

DESCRIPTION OF THE PREFERRED EMBODIMENT

Figures 1, 2:
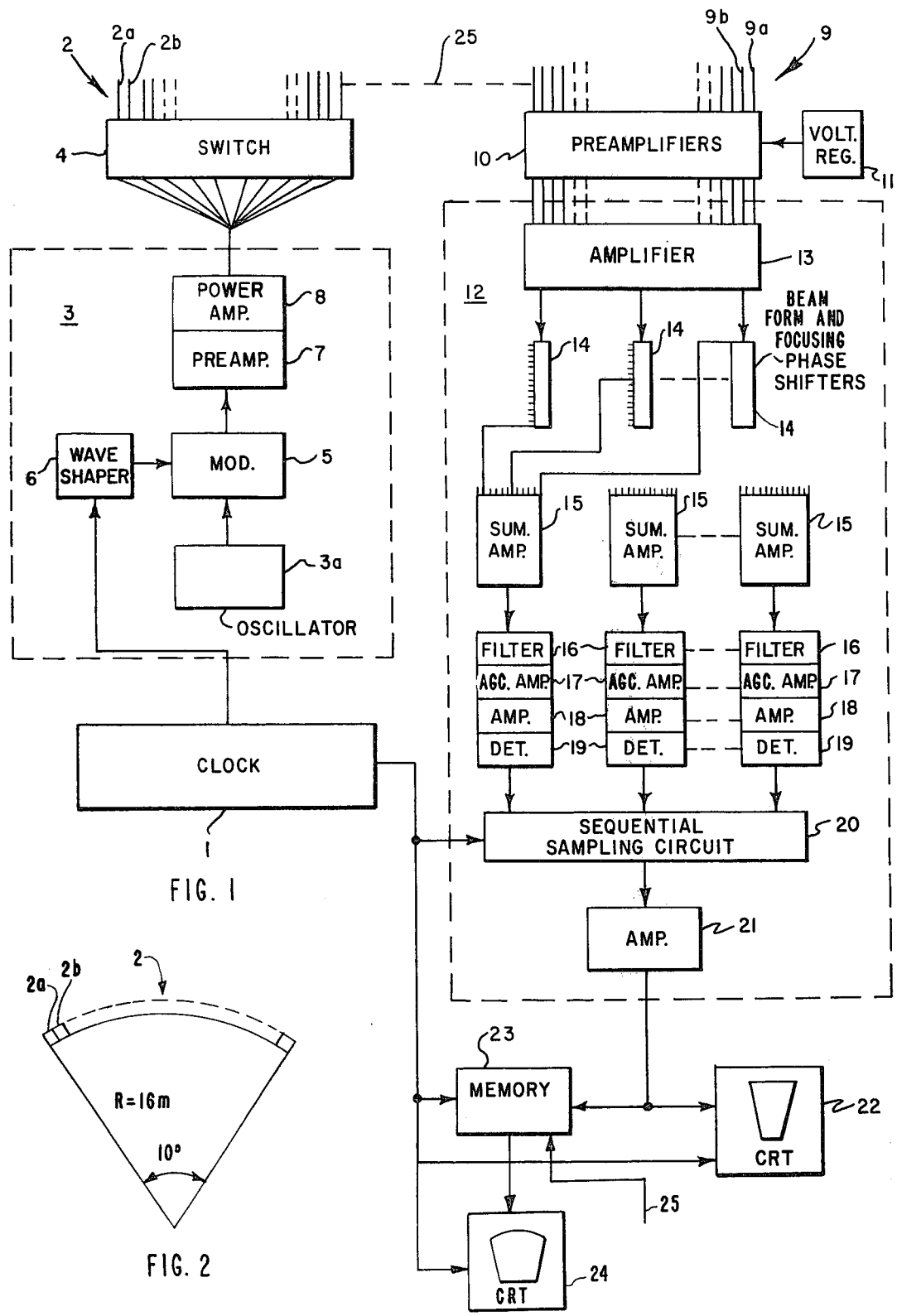
FIG. 1 is a diagrammatic, block form representation of a preferred embodiment of the invention.
FIG. 2 is a diagrammatic representation of the arrangement of the transducers shown in FIG. 1.

Referring to FIG. 1 of the drawing, a block diagram of a preferred embodiment is shown. A timing or control circuit uses a 10MHz oscillator as a time base. From this time base, timing circuit 1 controls acoustic pulses from a transmitting transducer 2 and, in particular, controls the period of the pulses, the form of the pulses and changing of the maximal range (275m, 225m, 175m). The maximal range increases with the time interval between successive pulses. Timing circuit 1 also controls the sampling of the monitoring channels described below at a frequency of 2MHz to form a wide band video signal. Acoustic pulses are produced by transmitting electronics, generally denoted 3, under the control of timing circuit 1 and are transmitted by projector system 2.

Referring additionally to FIG. 2 in accordance with a specific example, projector 2 is comprised of 648 transducers distributed in 108 columns all in parallel, the first two of which are indicated by 2a and 2b, of six transducers each. The columns of transducers are arranged along generatrices of a portion of a cylinder with a vertical axis, having a radius R on the order of 1.60 m.

The preferred embodiment provides two transmission modes. In the "wide" mode, transmission takes place over an angular section of 10°, while in the "narrow" mode, an angular section of 3° is covered. A switching circuit 4 is provided for switching between different modes.

The aforementioned transmission electronics 3 includes an oscillator 3a which, in accordance with the specific example under consideration, operates either at a fixed 420KHz ± 500Hz frequency, or a frequency modulated between 405KHz and 435KHz. A modulator 5 provides linear frequency modulation of the output of oscillator 3a in instances where frequency modulation is desired.

A pulse shaping control circuit 6 connected to modulator 5 provides shaping of acoustic pulses from oscillator 3a according to a (cosine)$^2$ law. Shaper control circuit 6 receives synchronization signals from timing circuit 1 which control the width of the acoustic pulses and time period between pulses. The width of the pulses determines the resolution power in distance and should be short. A specific embodiment provides a choice between a pulse width of 500$\mu$ seconds when the maximal range is explored and a 200$\mu$ second pulse width for the minimal range settings. The resolution power in distance can be represented by the expression t.c/2, where $t$ equals the pulse width, and c is the speed of wave propagation (approximately 1500 m/sec in water). Thus, for the figures given above, the resolution power in distance is on the order of 15 cm for the close range setting and approximately 40 cm at maximal range. The time period between pulses varies with the desired range and is approximately 260 milliseconds for a maximal range of 200 m.

Referring again to the drawing, the pulse signals from modulator 5 are amplified in a pre-amplifier 7 and power amplifier 8 before transmission by projector 2.

The receiver end of the system includes a receiving transducer generally denoted 9. The echoes of transmitted pulses are received by transducer 9 which is comprised of 100 vertical columns, the first two of which are denoted 9a and 9b, each made up of six transducers. The resulting speaking face has a length of 1.5 m. or approximately 400$\lambda$.

The signals picked up by each column of transducers are amplified by a plurality of pre-amplifiers 10 which, in a specific example, comprises 100 pre-amplifiers. A plurality of voltage regulators 11 control the supply of power to the pre-amplifiers 10. Each pre-amplifier 10 has an automatic gain control circuit and an effective gain of 80dB ± 1dB is provided.

The transmission and receiving transducers 2 and 9 are mounted on a single base indicated by chain line 25, preferably with their acoustic axes aligned. The base can be tilted between −7° and −28° in relation to the horizontal and rotated a full 360° around a vertical axis. Control of tilt and bearing are performed by an operator at a console (not shown).

Receiver electronics, generally denoted 12, provide for the simultaneous formation of 100 monitoring channels covering an angular section with a total opening of 10° in bearing. Each monitoring channel is formed by the summation of the signals received by the various transducers of array 9, the signals being shifted to take into account the delays which are necessary to obtain the right orientation of each channel.

Receiver electronics 12 perform two functions. One hundred similar circuits, one for each column of transducers, comprised of pre-amplifiers 10, amplifiers 13 and phase-shift networks 14 amplify and condition the outputs from transducer columns 9a, 9b, etc. An additional one hundred circuits, comprised of adding amplifiers 15, filters 16, automatic gain control amplifiers 17, amplifiers 18, and detectors 19, combine the outputs of the one hundred phase shift networks 14 so as to form one hundred monitoring channels.

Amplifier 13 receives signals from pre-amplifier 10 and provides a gain of 20dB ± 4dB and identical phase shifts for each of the 100 circuits. The outputs of amplifier 13 is connected to a plurality of phase-shift networks 14 which, in a specific example, provides 24 signals with phase shifts between 0° and 345° in 15° steps. A summing amplifier 15 performs the addition of 100 signals, each signal coming from one of the outputs of the phase shift networks 14. The phase of the resulting signal will thus be determined by the particular phase-shifted signals which are connected to the summing amplifier 15. The amplitudes of the 100 signals are also weighted by summing amplifier 15 by the use of resistors, with values determined by the theory of Chebychev polynomials, so as to obtain a desired ratio between the intensity of the main lobe and that of the secondary lobes of 21dB.

According to one important feature of the invention, the acoustic beams corresponding to the principal lobes of the monitoring channels are focused approximately at the center of the field of observation which, for the example given, is at a distance of about 130 m. from the transducer 9. This focusing can be achieved by any known technique including bending of the transducers or a phase shift of the received or transmitted signals. In a preferred embodiment, the desired focus is achieved by a phase weighting that is added to the necessary phase shifts normally needed to form the monitoring channels. This additional phase shifting is obtained by varying the selection of outputs of phase-shift network 14 as inputs to amplifier 15, by the desired added phase weights.

The additional phase weights are obtained according to a formula having the following parometers:

focal distance, $D_o$
a bearing of the channel, $\alpha$
pitch between the columns of receiver transducers
number of accoustical columns, $i$
wavelength $\lambda$ An example of a classic formula for calculation of the resulting phase $\phi$ is $$\phi = 2\pi/\lambda \sqrt{D_o^2 + X_i^2 + D_o^2\tan\alpha^2 + 2X_i D_o\tan\alpha}$$

where X is the abscissa of one column of transducers. In a specific example the focusing described above yields monitoring channels with angular width in bearing at the focus of 1/400 radian considering a lobe width of $-3dB$ in relation to maximal amplitude, which corresponds to a width cut on the bottom and, therefore, a resolution power in width, on the order of 30cm.

The angular pitch between each channel is $0.1°$, yielding a total of $10°$ for all 100 channels. This angular variation corresponds to a spacing between the channels of 20 cm. at the focal distance. The angular width of each channel at focal distance is approximately $0.16°$, resulting in a considerable overlapping of adjacent channels.

On both sides of the focus, the acoustic beams spread, but retain a sufficiently limited width so that resolution power in width is acceptable for a depth of field between 50 m. and the maximal limit of the Fresnel region.

From the range of 50 meters and down to the vicinity of the receiving transducer, the broadness of the acoustic beams increases until it reaches the length of the receiving transducer 9. Beyond the Fresnel region, the acoustic beams diverge as if they originated at the focal point and the widths thereof become greater and greater with distance. The limit of the Fresnel region is at a distance D from the receiving transducer 9 which is approximately equal to $\lambda/L^2$, where L is the length of the base of transducer 9 and $\lambda$ is the wavelength of the acoustic vibrations. Since length L is equal to 400 $\lambda$ in the specific example under consideration, the Fresnel region begins at about 500 m. for a frequency of 420 KHz. Thus, the desired maximal range is well within the Fresnel region.

Each of the 100 amplifiers 15 are connected to a quartz narrow band filter 16, which passes a band of frequencies around 420 KHz. It will be understood that these filters are not used in conjunction with frequency modulation transmission mentioned hereinabove but rather are used only in conjunction with fixed frequency transmission. An automatic gain control amplifier 17 provides each signal with a gain of 12dB thereby raising the level of each signal to approximately 120mV r.m.s. An additional amplifier 18 further increases this level by providing a gain of approximately 20dB so that an effective level of 1.2 volts r.m.s. is produced. A linear detection circuit 19 with an effective dynamic range of 60dB from 6mV to 6V, receives the output of amplifier 18.

The signals from each detection circuit 19 are sent to sampling circuit 20, which, for example, comprises a 100 lineto- 1 line multiplexer, making it possible to sequentially switch the 100 channels to a single output. The multiplexer is of known design and is controlled by pulses from timing circuit 1 at a frequency, for example, of 2MHz or 1MHz, as designed, depending on the width of the acoustic pulses. The sequential sample from sampler circuit 20 undergoes a non linear compression of dynamic range from approximately $40dB$ to $26dB$, the sample being then amplified by an amplifier 21.

A cathode ray tube 22 displays the output of amplifier 21 on a rectangular screen having, for example, dimensions of 24cm. $\times$ 12cm. The CRT 22 is scanned by a trace with a period of 60 $\mu$ seconds or 120 $\mu$ seconds, depending on the selected sampling frequency for sampling circuit 20. Timing circuit 1 synchronizes the sampling of circuit 20 with the display of CRT 22. Each horizontal scan provides display of the echoes collected at the channels at a given instant and therefore coming from a given distance. Successive scans, staggered in time, make it possible to display the progression of acoustic pulses in the form of an image on CRT 22. Thus, the site or distance, in the case of grazing incidence as when searching for influence ground mines which are laid on relative shallow bottoms going down to 60 meters, can be studied in detail.

The display sector of CRT 22 is presented in the form of an isoceles trapezoid, with horizontal bases whose vertical axis corresponds to the acoustic axis of transmitting and receiving transducers 2 and 9. This sector corresponds to the sector sounded by the projector, i.e., a sector having a width of $10°$ in the wide mode and $3°$ in the narrow mode. The trapezoid appears to remain stationary as the transducers are rotated around their vertical axes and a lighted indicator provides the azimuth of the displayed sector. The course of the ship on which the sonar system is located is transmitted by the ship's gyrocompass (not shown).

The image corresponding to the first 50 meters is automatically eliminated, due to its relatively poor quality. Attached to the face of the oscilloscope of CRT display 22 is a horizontal index to aid in locating shadows. In addition, two plotters are provided which bracket 25 meters in depth located on both sides of the preceeding plotters, together with a distance scale made up of regular spaced plotters, for example, one every 25 meters.

The sonar system further includes a memory 23 having an input control line 25 which enables displaying on a second CRT 24 on a larger scale, a zone of 25 meters in depth. This zone can be moved, continuously, over the entire depth of the field between 50 meters and 275 meters.

Signals from sequential sampler 20 and amplifier 21 are encoded into a natural binary code and stored upon receipt of a storage signal on input line 25, in memory 23 made up of, for example, looped magnetostrictive delay lines. Thus, the image of a desired zone can be stored and observed for a long time. The coded representation of a new image can replace the old image at any time as desired by the operator.

According to the invention, the binary coded memory output is decoded into an analog signal and combined with synchronization signals to form a composite video signal for display on CRT 24. Negative decoding of the memory allows a negative image to be displayed, i.e., white on black instead of black on white, which under certain circumstances offers greater ease of operation.

The operation of the sonar system described above is as follows:

An acoustic lobe whose angular width, at $-3dB$, can be adjusted to $10°$ for general exploration or $3°$ for a more detailed scan, is formed by the transmitting transducer. This lobe is produced by a pulse with a width of 200 $\mu$s or 500 $\mu$s depending on the maximal range desired. The time interval between pulses is relatively long when compared to pulse width and is great enough to permit each pulse to complete a round trip before the next pulse is transmitted. For example, a time interval of 370 ms. is chosen for a maximal range of 275 meters. The echo of a transmitted acoustic lobe is constantly explored by one hundred monitoring channels formed by receiver electronics 12. The spacing between the aforementioned channels has been adjusted to provide a desired spatial sampling considering the dimensions of an object to be observed.

Each channel is weighted in amplitude to keep secondary lobes to a minimum level of $-21dB$. Additional phase weighting is provided by phase-shifting networks 14 to focus the channels inside the Fresnel region. After conditioning by filters and amplifiers 15 to 19, the channel signals are sequentially sampled at a very high rate of, for example, 2MHz and displayed on CRT 22 to give an overall representation in real time of the observed sector. A selected portion of the resulting image can be stored and redisplayed on a second CRT 23 to permit detailed examination and a new selected portion can be substituted by the operator by means of his controls.

In summary, the present invention provides a number of advantages over conventional sonar systems. Due to the sharpness of the monitoring channels, areas as small as $0.2 m^2$ can be represented and angular resolutions of $0.16°$, corresponding to a width of 0.3 meters at a distance of 130 m. are obtainable. Images received are displayed with sufficient detail so as to permit an operator to distinguish objects and identify them by their silhouettes. In addition, a second display CRT 24, with the capability of an enlarged display of a selected portion of the first CRT and a memory system, provide an opportunity to study a received image in detail without time limitations.

Although the invention has been described with respect to an exemplary embodiment thereof, it will be understood that variations and modifications can be effected in these embodiments without departing from the scope and spirit of the present invention.

We claim:

1. A sonar system comprising means for generating very short acoustic pulses comprising very short ultrasonic waves; a transmitting transducer connected to said pulse generating means for transmitting said pulses; a receiving transducer mounted on a common support with said transmitting transducer for pivoting movement therewith, said receiving transducer receiving echoes of the pulses transmitted by said transmitting transducer and producing electrical signals in accordance therewith; phase shifting means for providing predetermined phase shifting of the electrical signals produced by said receiving transducer; means forming a plurality of monitoring channels for combining the outputs of said phase shifting means; means for sequentially sampling the outputs of said mointoring channels; at least one display means for displaying the output of said sampling means so as to provide a visual representation of the echoes received by said receiving transducer; means for focusing said receiving transducer inside the Fresnel region of said receiving transducer; and, timing means for synchronizing the acoustic transmission of said transmitting transducer, the operation of said sampling means and the operation of said display means.

2. A sonar system as claimed in claim 1 wherein said pulse generating means includes an oscillator; a modulator connected to said oscillator; a wave shaping control means connected to said modulator; at least one pre-amplifier connected to said modulator; and at least one power amplifier connected to said at least one pre-amplifier.

3. A sonar system as claimed in claim 1 wherein said transmitting and receiving transducers are comprised of a plurality of columns, said columns each containing a plurality of electroacoustical transducers.

4. A sonar system as claimed in claim 1 wherein said focusing means comprises means for providing further phase shifting of the phases of said electrical signals produced by said receiving antenna.

5. A sonar as claimed in claim 4 wherein the focal distance produced by said focusing means is approximately equal to one quarter of the length of the Fresnel region.

6. A sonar as claimed in claim 5 wherein said monitoring channels have a width substantially equal to 30cm. and a pitch substantially equal to 20cm.

7. A sonar as claimed in claim 1 wherein said display means includes a first cathode ray tube display; a second cathode ray tube display including means for selecting a portion of said first cathode ray tube display for enlargement on said second cathode ray tube display; a memory connected so as to permit an image displayed on said second cathode ray tube display to be stored thereby permitting a viewer an opportunity for examination of said image.

* * * * *